United States Patent [19]

Kobayashi et al.

[11] 4,324,822

[45] Apr. 13, 1982

[54] METAL CAN PAINT PROVIDING COATING RETAINING HIGH ADHESION EVEN WITH LAPSE OF TIME

[75] Inventors: Seishichi Kobayashi, Yokohama; Tatsuo Mori, Kawasaki; Akihiko Morofuji, Ohguchi Nakamachi, all of Japan

[73] Assignee: Toyo Seikan Kaisha Ltd., Tokyo, Japan

[21] Appl. No.: 165,658

[22] Filed: Jul. 3, 1980

[30] Foreign Application Priority Data

Jul. 6, 1979 [JP]  Japan .................................. 54/85016

[51] Int. Cl.$^3$ ...................... C08G 59/14; C08G 59/20; C08G 59/24
[52] U.S. Cl. ........................................ 428/35; 428/418; 525/109; 525/481; 525/510; 528/103; 528/104; 528/110; 528/365; 528/407; 523/100
[58] Field of Search ............... 528/104, 110, 418, 103, 528/365, 407; 525/109, 481, 510; 260/18 PN; 427/386, 239; 428/35, 418

[56] References Cited

U.S. PATENT DOCUMENTS

| 2,558,949 | 7/1951 | Greenlee | 528/87 |
| 3,405,093 | 10/1968 | Walker | 528/87 X |
| 3,477,990 | 11/1969 | Dante et al. | 528/87 X |
| 3,921,847 | 11/1975 | Rentmeester | 427/386 X |
| 3,932,144 | 1/1976 | Matsubara et al. | 428/418 X |
| 4,215,210 | 7/1980 | Okayama et al. | 528/93 |

Primary Examiner—Earl A. Nielsen
Attorney, Agent, or Firm—Sherman & Shalloway

[57] ABSTRACT

Disclosed is a paint for a can which comprises an epoxy resin component formed by condensation of a dihydroxyl compound with an epihalohydrin and a curing agent component, said epoxy resin component containing terminal $\alpha$-glycol groups at a concentration of 0.05 to 0.60 equivalent per Kg of the resin.

This paint provides a coating capable of retaining a high adhesion even with the lapse of time and resisting a severe treatment such as retort sterilization.

When this paint is applied to a bonded can, leakage of the content from the side seam with the lapse of time can be effectively prevented. When this paint is applied to a can provided with an easy-open can lid, occurrence of the enamel feather can be prevented at the time of opening the lid.

7 Claims, No Drawings

METAL CAN PAINT PROVIDING COATING RETAINING HIGH ADHESION EVEN WITH LAPSE OF TIME

BACKGROUND OF THE INVENTION (1) Field of the Invention

The present invention relates to a paint for a metal can comprising an epoxy resin component and a curing agent component, which is highly improved in the property of retaining a high adhesion even with the lapse of time.

(2) Description of the Prior Art

As cans for canned provisions and canned drinks, there have ordinarily been used so-called three-piece cans comprising a can body having on the side face a seam formed by soldering, bonding or welding and top and bottom lids double-seamed to the can body, and so-called two-piece cans comprising a seamless can body formed by drawing or draw-ironing and a lid double-seamed to the can body. In each of these cans, a protective coating is formed on the inner face in order to inhibit the metal from being dissolved out into the content and prevent corrosion of the can.

As the paint for forming such protective coating, there have been broadly used mixtures or precondensates of an epoxy resin component with other thermosetting resin component such as a resol type phenolic resin or an amino resin. In manufacturing cans, such paint is coated on a can blank before or after formation of a can body and the coated paint is baked to form a thermally cured coating. Coatings formed from conventional paints for cans are excellent in the adhesion to can blanks just after baking, but the adhesion is degraded with the lapse of time and this degradation of the adhesion with the lapse of time is further accelerated by retort sterilization or by contact with the aqueous content or its vapor.

This degradation of the adhesion of the protective coating with the lapse of time is not preferred from the viewpoints of prevention of corrosion of the can blank and retention of the flavor of the content, and furthermore, this degradation results in serious reduction of other properties of the can.

For example, in case of an easy-open lid which can easily be opened by a purchaser without using any particular tool, reduction of the adhesion of the coating causes a phenomenon in which the coating is left in the opening of the can in the form of a film or feather ordinarily called "enamel feather". More specifically, opening of the easy-open lid is performed by outwardly pulling an opening portion defined by a score (incompletely cut line) through a tab secured to this opening portion to break the score and taking out the opening portion. In this case, if the bonding force of the coating to the substrate is smaller than the tear strength of the coating per se, the coating is not correctly broken along the score and the coating present in the opening portion is left on the side of the can lid to form an enamel feather. Since it is difficult to prevent degradation of the adhesion with the lapse of time in thermally cured coatings, occurrence of this enamel feather has heretofore been prevented by reducing the tear strength by decreasing the thickness of the coating. However, reduction of the thickness of the coating should naturally render it difficult to attain complete cover of the can blank, especially complete cover of the score-formed portion, and the effects of inhibiting dissolution of the metal and preventing corrosion become insufficient.

Furthermore, in bonded cans where the side seam is formed by bonding, reduction of the adhesion of the coating causes leakage from the side seam with the lapse of time. This side seam is formed by lapping both the edges of the can blank to be bonded and heat-bonding the lapped edges through the thermally cured coating on the can blank by a polyamide adhesive. In this bonded can, the adhesion between this coating of the conventional epoxy resin type and the can blank is degraded with the lapse of time and leakage is finally caused.

SUMMARY OF THE INVENTION

We found that when an epoxy resin which is formed by condensation of a dihydroxyl compound with an epihalohydrin and has a concentration of the terminal α-glycol groups in a specific range is especially selected and a paint for a can is formed by combining this specific epoxy resin with a curing agent component, the above-mentioned degradation of the adhesion of the coating with the lapse of time can be prominently controlled.

It is therefore a primary object of the present invention to provide a novel paint for a can in which degradation of the adhesion of the coating is prominently controlled.

Another object of the present invention is to provide a paint for a can which can form a protective coating not causing the enamel feather phenomenon, on the inner face of an easy-open lid.

Still another object of the present invention is to provide a paint for a can which is valuable as an undercoating on the inner face of a can body and forming a side seam free of leakage even with the lapse of time together with an adhesive.

In accordance with the present invention, there is provided a paint for a can which comprises an epoxy resin component formed by condensation of a dihydroxyl compound with an epihalohydrin and a curing agent component, said epoxy resin component containing terminal α-glycol groups at a concentration of 0.05 to 0.60 equivalent (mol) per Kg of the resin.

DETAILED DESCRIPTION OF THE PREFERRED EMBODIMENTS

In the present invention, in order to prevent reduction of the adhesion of the coating with the lapse of time, it is very important that the epoxy resin component used in the present invention should contain terminal α-glycol groups having the following formula:

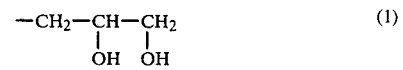

at a concentration of 0.05 to 0.60 equivalent per Kg of the resin, especially 0.10 to 0.55 equivalent per Kg of the resin.

By the term "epoxy resin" is meant a resin formed from a compound having more than one epoxy group in the molecule, which can be converted to a valuable thermally cured product (see Herman F. Mark, Encyclopedia of Polymer Science and Technology). Ordinarily, this resin is obtained by condensation of a dihydroxyl compound with an epihalohydrin, and the molecule chain is terminated with an epoxy group having the following formula:

$$-CH_2-CH-CH_2 \atop \diagdown O \diagup \quad (2)$$

It has been considered that this terminal epoxy group plays an important role in curing the epoxy resin.

It was found that when an epoxy resin component which contains not only such terminal epoxy groups but also terminal α-glycol groups at a specific concentration is used according to the present invention, degradation of the adhesion of the coating with the lapse of time is remarkably controlled as compared with the case where an epoxy resin component in which substantially all of terminal groups are epoxy groups is used.

Epoxy resin components customarily used for can paints hardly contain terminal α-glycol groups, or even if they have contain terminal α-glycol groups formed by side reactions, the concentration of these terminal groups is 0.01 equivalent per Kg of the resin at highest. These conventional resins provide coatings excellent in the mechanical strength and the barrier property against corrosive components and show an excellent adhesion just after curing. However, if these coatings are dipped in a 1% aqueous solution of sodium chloride maintained at 90° C. for 10 days, the adhesion strength is reduced to zero or less than 1/10 of the original adhesion strength. In contrast, when an epoxy resin component containing terminal α-glycol groups at a specific concentration is used for a can paint according to the present invention, even if the coating is subjected to the above-mentioned severe accelerated degradation test, the adhesion strength is maintained at a level higher than ½ of the original adhesion strength. In metal cans having this coating on the inner face thereof, various advantages can be attained. For example, in case of an easy-open can, occurrence of the enamel feather phenomenon is effectively prevented, and in case of a bonded can, leakage from the side seam with the lapse of time is effectively prevented.

When the concentration of the terminal α-glycol groups in the epoxy resin component is lower than 0.05 equivalent per Kg of the resin, it is difficult to effectively control degradation of the adhesion with the lapse of time. If the concentration of the terminal α-glycol groups in the epoxy resin component is higher than 0.60 equivalent per Kg of the resin, sufficient curing of the coating becomes difficult, and whitening of the coating or blistering is caused at the retort sterilization. Furthermore, a coating formed from a paint comprising an epoxy resin component containing an excessive number of terminal α-glycol groups is brittle and has insufficient mechanical strength.

The epoxy resin component that is used in the present invention should inherently contain terminal epoxy groups. It is preferred that the concentration of the terminal epoxy groups be 0.20 to 1.80 equivalents, especially 0.25 to 1.50 equivalents, per Kg of the resin. If the terminal epoxy group concentration is lower than 0.20 equivalent per Kg of the resin, curing of the coating is insufficient and troubles such as mentioned above are caused. If the terminal epoxy group concentration is higher than 1.80 equivalents per Kg of the resin, the terminal α-glycol group concentration is lower than the lower limit specified in the present invention and troubles such as mentioned above are caused.

In order to obtain an optimum balance between the thermosetting property and the control of degradation of the adhesion with the lapse of time, it is preferred that the molar ratio of terminal α-glycol groups/terminal epoxy groups be in the range of from 5/95 to 75/25, especially from 10/90 to 70/30.

Terminal hydroxyl groups derived from a dihydroxyl compound may be present in the epoxy resin component that is used in the present invention. The amount of these terminal hydroxyl groups is up to 50 mol %, especially up to 30 mol %, based on the total terminal groups.

The molecular weight of the epoxy resin component is not particularly critical, so far as the epoxy resin component has a film-forming property. When the paint is used for an easy-open lid for a bonded can or is used as an undercoating paint for a bonded can, it is preferred to use a relatively high-molecular-weight epoxy resin component having a number average molecular weight of 1400 to 5500, especially 2000 to 5000. When the paint is used as a powder paint used for correcting a coating on a side seam of a can body, it is preferred to use a relatively low-molecular-weight epoxy resin component having a number average molecular weight of 900 to 3000, especially 1000 to 2000.

An epoxy resin component that is preferably used in the present invention is represented by the following general formula:

$$Y \mathord{\left[ O-R-O-CH_2-CH(OH)-CH_2 \right]_{\overline{m}}} O-R-O-Y \quad (3)$$

wherein R stands for a divalent residue formed by removing two hydroxyl groups from a dihydroxyl compound, especially an alkylene or arylene group having 2 to 20 carbon atoms or a combination thereof, Y stands for $$-CH_2-CH(OH)-CH_2(OH), \ -CH_2-CH-CH_2 \atop \diagdown O \diagup$$

or a hydrogen atom, with the proviso that the following conditions (a) to (d) are satisfied: (a) the concentration of $$-CH_2-CH(OH)-CH_2(OH)$$

is 0.05 to 0.60 equivalent per Kg of the resin, (b) the concentration of $$-CH_2-CH-CH_2 \atop \diagdown O \diagup$$

is 0.20 to 1.80 equivalents per Kg of the resin, (c) the molar ratio of $$-CH_2-CH(OH)-CH_2(OH) \ \text{to} \ -CH_2-CH-CH_2 \atop \diagdown O \diagup$$

is in the range of from 5/95 to 75/25 and (e) terminal hydroxyl groups derived from a dihydroxyl compound may be present in an amount of up to 50 mol % based on the total terminal groups, and n is a number selected so that the number average molecular weight of the resin is 900 to 5500.

As the dihydroxyl compound, there can be mentioned dihydric phenols such as hydroquinone and resorcin, and phenols represented by the following general formula:

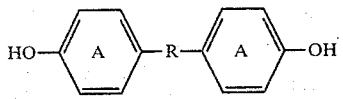

wherein R stands for a direct bond or a bridging group, especially an alkylidene group having up to 10 carbon atoms, —O—, —S— or —SO$_2$—, and the ring A may be substituted by a halogen such as Br or Cl, such as 2,2-bis(4-hydroxyphenyl)propane (bisphenol A), 2,2-bis(4-hydroxyphenyl)butane (bisphenol B), 1,1-bis-(4-hydroxyphenyl)ethane, bis(4-hydroxyphenyl)methane (bisphenol F), 4,4'-dihydroxybiphenyl, 4-hydroxyphenyl ether and tetrabromobisphenol A. Among these phenols, bisphenol A and bisphenol B are especially preferred.

As other examples of the dihydroxyl compound, there can be mentioned ethylene glycol, butane diol, diethylene glycol, polyethylene glycol, xylene glycol and an adduct of 1 to 2 mols of ethylene oxide to bisphenol A.

The terminal α-glycol group-containing epoxy resin that is used in the present invention can easily be prepared by hydrolyzing a terminal epoxy group-containing epoxy resin obtained by a known reaction so that the terminal α-glycol group concentration is in the above-mentioned range. This hydrolysis can be performed very easily in water in the presence of an acid or alkali. As the acid, there can be used a mineral acid such as hydrochloric acid or sulfuric acid. As the alkali, there can be mentioned sodium hydroxide, potassium hydroxide, lithium hydroxide, calcium hydroxide and sodium carbonate. It is generally preferred that an alkali be used for the hydrolysis. It is preferred that such hydrolyzing agent be used in such an amount that the concentration in water is 0.1 to 40%. At the hydrolyzing step, the epoxy resin is dissolved or dispersed in an aqueous medium containing a hydrolyzing agent such as mentioned above, and the hydrolysis is carried out under conditions of a hydrolysis temperature of 50° to 150° C. and a hydrolysis time of 10 minutes to 20 hours so that the terminal α-glycol group concentration is in the above-mentioned range. If the reaction is carried out at a relatively high temperature, an autoclave may be used, and furthermore, the reaction may be carried out under refluxing conditions.

The so formed epoxy resin containing terminal α-glycol groups is purified by neutralizing the acid or alkali in the aqueous medium, extracting the product with an organic solvent such as an aromatic solvent and/or a ketone type solvent, washing the extract with water according to need and removing water by azeotropic distillation or sedimentation.

The conventional processes for the manufacture of epoxy resins are divided into one-stage processes and two-stage processes. According to the one-stage process, an epihalohydrin and a dihydroxyl compound are condensed in one stage in the presence of an alkali metal type catalyst or an alkaline earth metal catalyst. This condensation may be carried out under such conditions that α-glycol groups are formed, or the resin formed by this condensation may be hydrolyzed according to the above-mentioned method. According to the two-stage process, an epihalohydrin and a dihydroxyl compound are condensed in the presence of a catalyst such as mentioned above to form a low-molecular-weight epoxy resin, and this low-molecular-weight epoxy resin and the dihydroxyl compound are further subjected to addition polymerization. In this case, when the above-mentioned hydrolysis is conducted on the low-molecular-weight epoxy resin formed in the first stage, the hydrolysis operation is facilitated. Of course, the high-molecular-weight resin obtained in the second stage may be subjected to the hydrolysis.

Of course, the terminal α-glycol group-containing epoxy resin that is used in the present invention may be prepared according to the so-called blend process. More specifically, an epoxy resin having a relatively high content of terminal α-glycol groups is prepared according to the above-mentioned hydrolysis process and this resin is blended with an ordinary epoxy resin so that the concentration of terminal α-glycol groups is in the above-mentioned range.

The terminal α-glycol group-containing epoxy resin that is used in the present invention is not limited to those prepared according to the above-mentioned processes. Terminal α-glycol group-containing epoxy resins prepared according to processes other than the above-mentioned processes may optionally be used in the present invention, so far as the terminal α-glycol group concentration is in the above-mentioned range.

Any of curing agent components known and used in this field can be used in combination with the terminal α-glycol group-containing epoxy resin in the present invention. Curing agent components that are preferably used in the present invention are as follows.

(1) Synthetic resin precondensates:
Resol type phenol-formaldehyde resins, urea-formaldehyde resins, benzoguanamine-formaldehyde resins and melamine-formaldehyde resins.

(2) Amino-terminated polyamide resins:
Polyamides composed of polymer fatty acids (dimer acids such as a dimer of linolenic acid) and polyamines such as ethylene diamine and diethylene triamine.

(3) Acid anhydrides:
Phthalic anhydride, maleic anhydride, itaconic anhydride, maleic anhydride-styrene copolymers, chlorendic anhydride, pyromellitic anhydride and tetrahydrophthalic anhydride.

(4) Amines:
Diethylene triamine, triethylene tetramine, phenylene diamine, o-toluidine, N-methylpiperazine, morpholine and other primary, secondary and tertiary amines.

(5) Others:
Dicyandiamide, 2-ethyl-4-methylimidazole, thermosetting acrylic resins and alkyd resins.

The mixing ratio of the curing agent component to the terminal α-glycol group-containing epoxy resin (hereinafter referred to as "AG epoxy resin") is considerably changed according to the intended use of the resulting can paint.

For example, in case of a baking type solution paint, a resin type curing agent such as a phenol-formaldehyde resin, a urea-formaldehyde resin, a melamine-formaldehyde resin, an acrylic resin, an alkyd resin, a polyamide resin or a mixture thereof is used in an amount of 5 to 60% by weight, especially 10 to 50% by weight, based on the AG epoxy resin. Both the resin components may be used in the form of a mere mixture or a precondensate thereof. As the solvent, there can be used at least one member selected from aromatic solvents such as toluene and xylene, alcoholic solvents such as ethanol and butanol, ketone type solvents such as methylethyl ketone and cyclohexanone and ester type solvents such as butyl acetate. These components are formed into a solution having a solid content of 10 to 50%, and the solution is used as the paint. Known modifiers or additives, for example, modifiers such as fatty acids, polymer fatty acids, rosin, drying oils and xylene resins may be incorporated into the paint or included into the paint by pre-condensation. Furthermore, levelling agents such as vinyl acetal resins and silicone oils, lubricants such as waxes and curing promotors such as phosphoric acid and metal salts of naphthenic acid may be incorporated into the paint.

In case of a baking type powdery paint, a curing agent such as an acid anhydride or dicyandiamide is blended in an amount of 3 to 40% by weight into a solid AG epoxy resin having a relatively low molecular weight, and the blend is pulverized to form a powdery paint.

In case of a rapid-curing two-pack type paint, an amine type curing agent may be incorporated in an amount of 2 to 50% by weight based on the AG epoxy resin.

The paint according to the present invention may be applied to a can blank in an optional stage.

For example, in case of a three-piece can having a side seam, the paint is applied to a can blank such as a black plate, a coated steel plate, a plated steel plate having the surface plated with tin, chromium, aluminum or zinc, a steel plate having the surface chemically treated or cathodically electrolyzed with chromic acid and/or phosphoric acid, a plate of a light metal such as aluminum or a composite metal blank formed by bonding and laminating an aluminum foil or the like to an organic substrate such as a resin film of polyolefin or the like or a paper board, and the coated paint is then baked. Then, seaming is carried out by soldering, welding or bonding using an adhesive to form a can body.

A coated can blank such as mentioned above is punched and press-formed, and score-forming processing, button-forming processing or tab-attaching processing is carried out according to need, whereby a can lid or an easy-open can lid is formed. Of course, the above-mentioned order may be reversed. Namely, there may be adopted a method in which the paint according to the present invention is applied to a formed can body or can lid or a formed can and the paint is then baked. This paint may be formed in the form of a single coat or a double coat.

In case of a seamless can body, a can blank such as mentioned above is subjected to drawing processing or draw-ironing processing, and the above-mentioned paint is coated on the can body and baked. This order may be reversed. Namely, the paint may be coated and baked on the can blank before drawing processing or draw-ironing processing.

The solution type paint according to the present invention can be applied to a can blank, a can body, a can lid or a can according to optional means, for example, dip coating, roller coating, spray coating, brush coating, electrostatic coating, electric deposition coating, wire coating, flow coating or doctor coating. The thickness of the coating may be 1 to 20 microns, especially 2 to 15 microns, in the dry state.

The curing conditions are changed according to the kinds of the epoxy resin and the curing agent in the paint, but generally, the curing operation is carried out at a temperature of 150° to 250° C. for 1 to 20 minutes so that the degree of curing is at least 70%. By the term "curing degree" referred to in the instant specification is meant a percentage of the extraction residue left when the coating is extracted with methylethyl ketone. The curing degree is determined according to a method described in detail hereinafter.

The paint according to the present invention is especially valuable as an inner face coating of an easy-open can in which enamel feathers are eliminated. Namely, in the coating formed from the paint of the present invention, the adhesion strength is hardly reduced even if the coating is kept in contact with the content liquid for a long time or the coating is subjected to retort sterilization after packing and is then kept in contact with the content liquid for a long time. When the score is broken at the time of opening, the coating is cut precisely along the score and no unpleasant feeling is given to a purchaser. Furthermore, this advantage is similarly attained even if the thickness of the coating in the score portion is increased to a level much larger than the thickness attained in the conventional technique so that the score portion can be completely protected.

The paint according to the present invention is valuable also for the manufacture of coated bonded cans to be subjected to retort sterilization. More specifically, the coating prepared from the paint of the present invention is advantageous in that even if the coated can is stored for a long time after retort sterilization, corrosion of the metal substrate or dissolution of the metal is remarkably inhibited. Another advantage of this coating is that reduction of the adhesion of the side seam portion bonded by a nylon type adhesive, especially the side seam portion to which a can lid is double-seamed, with the lapse of time is prominently controlled.

This bonded can body is prepared by applying the above-mentioned paint to a can blank composed of a steel plate electrolytically treated with chromic acid (tin-free steel), baking the paint to form a coated can blank and applying a tape of a nylon adhesive, by heat-bonding, to the edges of the blank to be bonded together. A linear homopolyamide, copolyamide or modified polyamide having a relative viscosity ($\eta$rel) of at least 1.5, preferably at least 1.8, as measured with respect to a 1% solution in 98% concentrated sulfuric acid, or a mixture thereof is preferably used as the nylon type adhesive. More specifically, there are preferably employed homopolyamides such as polyhexamethylene adipamide, polyhexamethylene sebacamide, polyhexamethylene dodecamide, polydodecamethylene dodecamide, poly(6-aminocaproic acid), poly(11-aminoundecanoic acid) and poly(12-aminolauric acid), copolyamides of constituent monomers of the above homopolyamides, that is, dicarboxylic acid/diamine salt or at least two of $\omega$-aminocarboxylic acids, and modified polyamides formed by modifying these homopolyamides or copolyamides with polymer fatty acids. From the viewpoint of the adhesion strength of the adhesive, it is preferred that a crystalline polyamide adhesive be used.

Then, the blank having an adhesive layer formed on the side edges is formed into a cylinder, the adhesive layer is heated at a melting temperature, and the lapped portion is bumped under cooling to form a can body having a side seam.

The so formed can body is subjected to flanging processing and a can lid is double-seamed to the can body. The double seam portion on the side seam has a much increased thickness as compared with the thickness of the other double seam portion. Accordingly, large and complex tensile contraction and shear stress are imposed on the metal substrate, coating and adhesive layer in the double seam portion on the side seam.

Therefore, in the double seam portion on the side seam, the metal substrate and adhesive layer undergo much larger tensile stress and compressive stress than in the other double seam portion, and a shear stress is imposed on the coating layer interposed between the metal substrate and the adhesive layer, with the result that the cohesive failure is caused in the coating or peeling is caused in the interface between the coating and the metal substrate or adhesive layer. Even if such breakage is not immediately caused, the cohesive failure or peeling is finally caused by the residual stress while the can is stored for a long time.

In contrast, the coating formed from the paint of the present invention has an excellent moderating action to the above-mentioned shear stress imposed on the coating layer, and as illustrated in Examples given hereinafter, the cohesive failure or peeling of the coating is effectively prevented, and leakage is not caused at all before or after retort sterilization or while the can is stored for a long time.

These advantages are similarly attained when a great number of circumferential beads are formed on a bonded can body to reinforce the can body composed of a thin metal blank.

It must be understood that these advantages of the coated can according to the present invention can be attained not only in the case where the paint is applied to a can blank before formation into a can body but also in the case where the paint is applied to the inner face of a formed can body or can.

For example, in case of a seamless can formed by draw-ironing, the coated can is subjected to necking and flange processing, and the metal blank simultaneously undergoes compressive stress (necking) and tensile stress (flanging) and the coating on the metal blank similarly undergoes shear stress. The coating of the present invention has sufficient resistance to such processing.

The paint of the present invention, especially the powdery paint, is very effective for preventing corrosion of the side seam, especially the side seam of a welded can, and dissolution of the metal by coating such side seam with the paint of the present invention. In this case, the powdery paint is deposited on the metal-exposed portion of the welded seam or the adjoining portion thereof by electrostatic coating, fluidized bed dip coating or flame spraying, and the powdery paint is molten simultaneously with deposition or after deposition, whereby a cured coating is formed. Also in this case, the paint of the present invention provides a coating having a sufficient thickness and the resulting coating retains a high adhesion to the metal-exposed portion even with the lapse of time. The deposited paint is baked at 150° to 400° C. for 1 second to 20 minutes so that the curing degree is 70%.

The present invention will now be described in detail with reference to the following Examples that by no means limit the scope of the present invention.

PREPARATION OF EPOXY RESINS

A reaction vessel equipped with a stirrer, a thermometer, a condenser and a dropping funnel was charged with 10 mols of epichlorohydrin, 1 mol of bisphenol A and 5 g of water. Then, 2.05 mols of solid sodium hydroxide was added little by little in the following manner.

At first, 10 g of sodium hydroxide was added and the mixture was heated to 90° C. under agitation by a mantle heater. Then, the mantle heater was replaced by an ice water bath and 10 g of sodium hydroxide was added. Then, the remainder of sodium hydroxide was gradually added so that the temperature did not exceed 100° C. After completion of the addition of the total amount of sodium hydroxide and completion of the exothermic reaction, excessive epichlorohydrin was removed so that the temperature in the reaction vessel did not exceed 130° C.

The residue was cooled to 70° C. and 50 ml of benzene was added to the reaction mixture to precipitate the salt. The salt was removed by filtration under reduced pressure. The residue was washed with 50 ml of benzene and benzene was removed by distillation under reduced pressure to obtain a viscous low-molecular-weight epoxy resin (A).

The number average molecular weight of this epoxy resin was 375 as measured in ethylene dichloride according to the boiling point elevation method. The epoxy group concentration was 5.13 eq/Kg as measured according to the hydrochloric acid-dioxane method and the α-glycol group concentration was 0.02 eq/Kg as measured according to the periodic acid oxidation method.

DETERMINATION OF NUMBER AVERAGE MOLECULAR WEIGHT

Ethylene dichloride solutions containing 2, 4, 6, 8 and 10% of the epoxy resin were prepared, and the elevation ΔT of the boiling point at each concentration was measured. The number average molecular weight of the sample was calculated according to the following formula:

$$\overline{Mn} = Kb \frac{1000\, w_2}{\Delta T w_1}$$

Kb stands for the molar elevation of the boiling point (3.12 in case of ethylene dichloride), $w_1$ stands for the weight (g) of ethylene dioxide and $w_2$ stands for the weight (g) of the epoxy resin.

For each of the ethylene dioxide solutions differing in the epoxy resin concentration, the value $\overline{Mn}$ was calculated according to the above formula, and a graph showing the relation between $\overline{Mn}$ and $w_2/w_1$ was drawn. The value of $\overline{Mn}$ at the point where $w_2/w_1$ was 0 was designated as the number average molecular weight of the epoxy resin.

DETERMINATION OF EPOXY GROUP CONCENTRATION

The weight of a sample having 2 to 4 meq of epoxy groups was precisely measured and the sample was charged in a plugged flask, and 25 ml of a 0.2 N hydrochloric acid-dioxane solution (formed by mixing 1.6 ml of concentrated hydrochloric acid with 100 ml of dioxane) was added to dissolve the sample therein. The solution was allowed to stand still at room temperature for 15 minutes and 25 ml of a neutral alcohol (formed by adding 1 ml of a Cresol Red indicator to 100 ml of anhydrous alcohol and neutralizing the alcohol with a 0.1 N sodium hydroxide solution of methyl alcohol) was added to the solution, and excessive hydrochloric acid was titered with a 0.1 N standard solution of sodium hydroxide. The blank test was conducted in the same manner. The epoxy group concentration was calculated according to the following formula:

$$\text{Epoxy group concentration (eq/Kg)} = \frac{N(B - S)}{W}$$

wherein B stands for the amount (ml) of the 0.1 N NaOH solution required at the blank test, S stands for the amount (ml) of the 0.1 N NaOH solution required for titration of the sample, N stands for the normality of the NaOH standard solution and W stands for the weight (g) of the sample.

DETERMINATION OF α-GLYCOL GROUP CONCENTRATION

About 1 g of the epoxy resin precisely weighed was charged in a plugged flask and 50 ml of chloroform was added to dissolve the sample therein. Then, 50 ml of a periodic acid reagent (formed by dissolving 5.4 g of periodic acid in 100 ml of water and incorporating 1900 ml of glacial acetic acid to the solution) was added and mixed homogeneously with the sample solution. The mixture was allowed to stand still at room temperature for 30 minutes, and 20 ml of a 20% solution of potassium iodide and 5 ml of a 10% solution of sulfuric acid were added to the mixture. Then, the mixture was titered with a 0.1 N standard solution of sodium thiosulfate by using starch as the indicator. The blank test was conducted in the same manner. The α-glycol group concentration was calculated according to the following formula:

$$\alpha\text{-Glycol group concentration (eq/Kg)} = \frac{(B - S) \times N}{2 \times W}$$

wherein B stands for the amount (ml) of Na$_2$S$_2$O$_3$ required at the blank test, S stands for the amount (ml) of Na$_2$S$_2$O$_3$ required for titration of the sample, N stands for the normality of the Na$_2$S$_2$O$_3$ standard solution and W stands for the weight (g) of the sample.

A flask was charged with 300 g of the above-mentioned epoxy resin (A) and 200 g of a 5% aqueous solution of sodium hydroxide, and the mixture was heated at 100° C. for 10, 20, 30, 60, 120 or 180 minutes to hydrolyze the epoxy groups. Then, the temperature was lowered to 70° C. and 10% hydrochloric acid was added to effect neutralization. The aqueous layer was removed by a siphon, and 150 ml of benzene was added to the residue and the precipitated salt was removed by filtration. Then, the residue was washed with 150 ml of benzene and benzene was removed by distillation under reduced pressure. Thus, epoxy resins (B), (C), (D), (E), (F), (G) and (H) shown in Table 1 were obtained.

TABLE 1

| Low-Molecular-Weight Epoxy Resin | Epoxy Group Concentration (eq/Kg) | α-Glycol Group Concentration (eq/Kg) |
|---|---|---|
| A | 5.13 | 0.02 |
| B | 5.07 | 0.05 |
| C | 5.03 | 0.09 |
| D | 4.96 | 0.15 |
| E | 4.81 | 0.29 |
| F | 4.67 | 0.41 |
| G | 4.52 | 0.55 |
| H | 4.31 | 0.74 |

Each low-molecular-weight epoxy resin in an amount corresponding to one equivalent of the epoxy groups $$\left( \frac{1}{\text{epoxy group concentration}} \times 1000, \text{g} \right)$$

was mixed with 0.45 mol of bisphenol A and 10 mg of sodium hydroxide, and the temperature was elevated to 200° C. with stirring and the mixture was heated at this temperature for 140 minutes. The formed resin was rapidly cooled to obtain a high-molecular-weight epoxy resin.

Properties of the so obtained high-molecular-weight epoxy resins are shown in Table 2.

TABLE 2

| High-Molecular Weight Epoxy Resin | Epoxy Group Concentration (eq/Kg) | α-Glycol Group Concentration (eq/Kg) | α-Glycol Group/ Epoxy Group Molar Ratio | Number Average Molecular Weight |
|---|---|---|---|---|
| A | 0.76 | 0.01 | 1.3/98.7 | 2,507 |
| B | 0.72 | 0.03 | 4/96 | 2,577 |
| C | 0.70 | 0.07 | 9/91 | 2,510 |
| D | 0.66 | 0.12 | 15/85 | 2,474 |
| E | 0.53 | 0.26 | 33/67 | 2,442 |
| F | 0.42 | 0.38 | 47/53 | 2,410 |
| G | 0.30 | 0.52 | 64/36 | 2,349 |
| H | 0.15 | 0.70 | 82/18 | 2,263 |

PREPARATION OF PHENOL-ALDEHYDE RESIN

A reaction vessel was charged with a mixed phenol comprising 0.5 mol of bisphenol A and 0.5 mol of o-cresol and 1.2 mols of a 37% aqueous solution of formaldehyde and the mixture was heated at 50° C. under agitation to form a solution. Then, 0.2 mol of a 25% aqueous solution of diethanol amine as the basic catalyst was added to the solution, and the temperature was elevated to 90° C. and reaction was carried out for 2 hours.

Then, a mixed solvent comprising 30 parts of methylisobutyl ketone, 20 parts of cyclohexanone and 50 parts of xylene was added to the reaction mixture to extract the condensation product. The extract was washed with deionized water 2 times, and the aqueous layer was removed and a small amount of residual water was removed by azeotropic distillation. The residue was cooled to obtain a 30% solution of a phenol-formaldehyde resin.

The number average molecular weight of the so obtained resin was 343 as measured in an ethylene dichloride solvent according to the boiling point elevation method. The methylol group concentration in the resin was 0.15. The number of methylol groups per phenol ring determined according to the nuclear magnetic resonance method was designated as the methylol group concentration.

PREPARATION OF UREA-ALDEHYDE RESIN

A reaction vessel equipped with a condenser, a thermometer and a stirrer was charged with 243 g (3.0 mols) of a 37% aqueous solution of formaldehyde and 5 g of concentrated aqueous ammonia, to maintain the pH value at 7.5 to 8.5. Then, 60 g (1.0 mol) of urea was added to the mixture under agitation, and the temperature of the mixture was elevated to 100° C. over a period of 1 hour by a mantle heater. The mixture was maintained at this temperature for 30 minutes. Then, 148 g (2.0 mols) of n-butanol was added to the mixture and phosphorus acid was added to the mixture to adjust the pH value to 5.5. The mixture was heated at 100° C. and was stirred at this temperature for 30 minutes. Water was removed at 70° C. under 150 mm Hg by suction by a water-jet pump to obtain a urea-aldehyde resin. The number average molecular weight of this resin was 820.

The resin was dissolved in a mixed solvent comprising 50% by weight of xylene and 50% by weight of n-butanol to form a 60% solution of the urea-formaldehyde resin.

COMPARATIVE EXPERIMENT 1

In this comparative experiment, paints were prepared from the above-mentioned epoxy resins and phenol-aldehyde resin, and these paints were coated and baked on metal blanks. The curing degree (determined by the extraction with methylethyl ketone) of each coating, the degree of whitening of each coating by the retort treatment and reduction of the adhesion of each coating to the metal blank with the lapse of time were examined.

The paints used in the experiment were prepared in the following manner.

The high-molecular-weight epoxy resin shown in Table 2 was dissolved in a mixed solvent comprising 50% by weight of butyl cellosolve and 50% by weight of xylene to form a 35% solution of the epoxy resin.

Then, the above-mentioned phenol-aldehyde resin solution was incorporated into the so formed epoxy resin solution so that the epoxy resin/phenol-aldehyde resin weight ratio was 70/30. Then, precondensation was carried out at 110° C. for 2 hours to form a paint.

Each of so obtained paints was coated on an electrolytically chromium-treated steel plate (tin-free steel, TFS), a tinplate, a cold-rolled steel plate or a chromic acid-treated aluminum plate, each having a thickness of 0.23 mm, and baked at 205° C. for 10 minutes. The thickness of the cured coating was 4 to 6μ.

The so obtained coated metal plate was cut into 10 cm × 1 cm. Two cut pieces were piled so that the coated surfaces confronted each other, and a film of a polymer of 12-aminolauric acid having a thickness of 100μ and a width of 12 mm, which had been vacuum-dried overnight, was inserted between the piled cut pieces and heat bonding under pressure was conducted for 3 seconds. The adhesion strength of the so formed sample and the adhesion strength of the sample after dipping in a 1% aqueous solution of sodium chloride at 90° C. were determined according to the T-peel test method as 20° C. Separately, the paint-coated and baked TFS plate was cut into 10 cm × 2 cm, and the cut pieces were dipped in city water and subjected to the retort treatment at 121° C. for 90 minutes and whitening of the coating was examined.

Furthermore, the coated TFS plate was cut into 10 cm × 10 cm and the weight ($w_0$) was measured. The specimen was extracted with methylethyl ketone (MEK) at 80° C. for 2 hours and was dried at 150° C. for 20 minutes, and the weight ($w_1$) was measured. Then, the specimen was dipped in concentrated sulfuric acid. The remaining coating was separated, washed with water and dried, and the weight ($w_2$) was measured. The curing degree of the coating was calculated according to the following formula:

$$\text{Curing degree (\%)} = \frac{w_1 - w_2}{w_0 - w_2} \times 100$$

Results of the measurements of reduction of the water-resistant adhesion strength of the coating to the metal blank by the T-peel strength test and of the curing degree of the coating are shown in Table 3.

TABLE 3

| Run No. | Example No. | Kind | Epoxy Group Concentration (eq/Kg) | α-Glycol Group Concentration (eq/Kg) | Curing Degree (%) | Whitening of Coating by Retort Treatment |
|---|---|---|---|---|---|---|
| | | High-Molecular-Weight Epoxy Resin Used | | | | |
| 1 | 1 | C | 0.70 | 0.07 | 85.9 | O |
| 2 | 2 | D | 0.66 | 0.12 | 83.8 | O |
| 3 | 3 | E | 0.53 | 0.26 | 82.2 | O |
| 4 | 4 | F | 0.42 | 0.38 | 81.0 | O |
| 5 | 5 | G | 0.32 | 0.52 | 79.7 | O |
| 6 | 6 | A(50 parts) H(50 parts) | 0.46 | 0.36 | 80.8 | O |
| 7 | comparison 1 | A | 0.76 | 0.01 | 86.7 | O |
| 8 | comparison 2 | B | 0.72 | 0.03 | 86.5 | O |
| 9 | comparison 3 | H | 0.15 | 0.70 | 58.0 | X |

| | Reduction of Water-Resistant Adhesion Strength [T-peel adhesion strength (Kg/cm)] | | | | | | | |
|---|---|---|---|---|---|---|---|---|
| | TFS Plate | | Tinplate | | Cold-Rolled Steel Plate | | Aluminum Plate | |
| Run No. | as-prepared | after standing at 90° C. for 10 days in 1% solution of NaCl | as-prepared | after standing at 90° C. for 10 days in 1% solution of NaCl | as-prepared | after standing at 90° C. for 10 days in 1% solution of NaCl | as-prepared | after standing at 90° C. for 10 days in 1% solution of NaCl |

TABLE 3-continued

| | | | | | | | | |
|---|---|---|---|---|---|---|---|---|
| 1 | 24 | 15 | 10 | 7 | 23 | 10 | 21 | 14 |
| 2 | 25 | 17 | 11 | 7 | 23 | 13 | 22 | 15 |
| 3 | 26 | 18 | 10 | 8 | 24 | 13 | 22 | 15 |
| 4 | 25 | 19 | 10 | 8 | 25 | 14 | 21 | 16 |
| 5 | 23 | 19 | 9 | 8 | 23 | 15 | 20 | 17 |
| 6 | 23 | 19 | 9 | 7 | 23 | 14 | 21 | 17 |
| 7 | 25 | 0 | 10 | 0 | 23 | 0 | 21 | 0 |
| 8 | 24 | 3 | 11 | 0 | 22 | 0 | 22 | 0 |
| 9 | 18 | 8 | 5 | 2 | 15 | 7 | 17 | 8 |

COMPARATIVE EXPERIMENT 2

In this comparative experiment, paints were prepared from the above-mentioned epoxy resins and urea-aldehyde resin, and they were coated and baked on metal blanks. The curing degree of each coating, the degree of whitening of each coating after the retort treatment and reduction of the adhesion of each coating to the metal blank were examined.

Each of the high-molecular-weight epoxy resins shown in Table 2 was mixed with the above-mentioned urea-aldehyde resin so that the epoxy resin/urea-aldehyde resin weight ratio was 80/20, to form an epoxy-urea paint.

In the same manner as described in Comparative Experiment 1, the so obtained paints were coated and baked on various metal blanks (TFS plate, tinplate, cold-rolled steel plate and aluminum plate). In the same manner as described in Comparative Experiment 1, by using the coated TFS plate, the degree of whitening of the coating by the retort treatment was examined and the curing degree was measured by the extraction of the coating with MEK.

The epoxy-phenol paint obtained in Example 1 in Comparative Experiment 1 was coated in a thickness of 0.5 to 1μ on the coated surface of each of the so obtained coated metal plates, and the coated paint was baked. With respect to each of the so obtained coated plates, reduction of the water-resistant adhesion strength of the epoxy-urea paint coating to the metal blank with the lapse of time was examined in the same manner as described in Comparative Experiment 1.

The obtained results are shown in Table 4.

TABLE 4

| | | High-Molecular-Weight Epoxy Resin Used | | | | |
|---|---|---|---|---|---|---|
| Run No. | Example No. | Kind | Epoxy Group Concentration (eq/Kg) | α-Glycol Group Concentration (eq/Kg) | Curing Degree (%) | Whitening of Coating by Retort Treatment |
| 10 | 7 | C | 0.70 | 0.07 | 90.3 | O |
| 11 | 8 | D | 0.66 | 0.12 | 90.2 | O |
| 12 | 9 | E | 0.53 | 0.26 | 89.7 | O |
| 13 | 10 | F | 0.42 | 0.38 | 89.0 | O |
| 14 | 11 | G | 0.32 | 0.52 | 87.0 | O |
| 15 | 12 | A(50 parts) H(50 parts) | 0.46 | 0.36 | 89.3 | O |
| 16 | comparison 4 | A | 0.76 | 0.01 | 90.7 | O |
| 17 | comparison 5 | B | 0.72 | 0.03 | 91.0 | O |
| 18 | comparison 6 | H | 0.15 | 0.70 | 62.8 | X |

| | Reduction of Water-Resistant Adhesion Strength [T-peel adhesion strength (Kg/cm)] | | | | | | | |
|---|---|---|---|---|---|---|---|---|
| | TFS Plate | | Tinplate | | Cold-Rolled Steel Plate | | Aluminum Plate | |
| Run No. | as-prepared | after standing at 90° C. for 18 days in 1% solution of NaCl | as-prepared | after standing at 90° C. for 18 days in 1% solution of NaCl | as-prepared | after standing at 90° C. for 14 days in 1% solution of NaCl | as-prepared | after standing at 90° C. for 18 days in 1% solution of NaCl |
| 10 | 20 | 12 | 17 | 9 | 19 | 7 | 19 | 11 |
| 11 | 21 | 14 | 16 | 10 | 18 | 9 | 19 | 11 |
| 12 | 22 | 14 | 16 | 11 | 18 | 9 | 18 | 12 |
| 13 | 22 | 15 | 15 | 11 | 18 | 10 | 17 | 12 |
| 14 | 20 | 16 | 15 | 12 | 17 | 11 | 17 | 18 |
| 15 | 20 | 16 | 15 | 11 | 17 | 10 | 17 | 12 |
| 16 | 21 | 0 | 17 | 0 | 19 | 0 | 18 | 0 |
| 17 | 21 | 0 | 16 | 0 | 19 | 0 | 19 | 0 |
| 18 | 16 | 4 | 13 | 3 | 12 | 2 | 14 | 4 |

COMPARATIVE EXPERIMENT 3

In this comparative experiment, easy-open can lids of a tinplate and an aluminum plate were prepared by using the same epoxy-urea paint as used in Comparative Experiment 2, and a sweetened adzuki bean soup was packed and the can lids were tested and evaluated.

The epoxy-urea-aldehyde paint shown in Table 4 in Comparative Experiment 2 was roll-coated on a tinplate having a thickness of 0.23 mm and an amount deposited of tin of 5.6 g/m² or a chromic acid-treated aluminum plate having a thickness of 0.35 mm so that the thickness of the resulting coating was 4μ and the coated surface became the outer surface of the resulting can. The coated paint was baked at 195° C. for 10 minutes. Then, the same paint was coated on the other surface so that the thickness of the resulting coating was 5μ and the coated paint was baked at 205° C. for 10 minutes to obtain a coated plate.

A 202-diameter lid was punched from the so obtained coated plate by an ordinary lid-forming puncher, and scoreforming processing, button-forming processing and tabattaching processing were carried out by using ordinary processing machines. Then, a styrene-butadiene rubber type sealing compound was coated and dried. In order to correct defects of the inner face coating caused by the score-forming processing, a modified vinyl paint (formed by incorporating 5 parts of a benzoguanamine-aldehyde resin into 100 parts of a vinyl chloride-vinyl acetate copolymer) was spray-coated on the can lid by an airless spray gun so that the thickness of the resulting dry coating was about 10μ or about 30μ. The coated can lid was dried at 160° C. for 4 minutes to obtain a 202-diameter easy-open can lid.

The degree of correction of the defects of the coating in the score portion of the coating was examined in the following manner.

A cylinder of an acrylic resin having an outer diameter of 58 mm, an inner diameter of 54 mm and a height of 50 mm was placed on the inner face of the so obtained easy-open can lid, and the contact area between the can lid and the cylinder was sealed with a wax. Then, 50 ml of a 1% solution of sodium chloride was poured into the cylinder and constant voltage electrolysis was carried out at a voltage of 6.4 V for 10 seconds by using a carbon rod as the counter electrode. The average current value was read.

The coating having a correction coating thickness of 10μ or 30μ was taken out from the tinplate easy-open lid by the amalgamation process using mercury, and cuts were formed on the coating and the tear strength was measured at 20° C. by a tensile tester. When the thickness was 10μ, the tear strength was 2 g and when the thickness was 30μ, the tear strength was 8 g.

The so obtained easy-open can lid was double-seamed to a 202-diameter tinplate can body (having an inner capacity of 190 ml) prepared by a known method by a double seamer, and a sweetened adzuki bean soup was hot-packed in the can at 98° C. Then, a 202-diameter tinplate lid formed by coating and baking the epoxy-phenolaldehyde paint of Example 3 on a tinplate having a thickness of 0.23 mm, punching and pressing the coated tinplate and applying the above-mentioned sealing compound to the formed lid was double-seamed to the packed can body. The packed can was subjected to retort treatment at 121° C. for 60 minutes and the can was stored at 50° C. for 3 months in the state where the easy-open can lid was located below.

With respect to each sample, the opening portion of the easy-open can lid was opened after the storage, and the area of the coating left in the opening portion (enamel feather, %) was examined. The easy-open lid was taken out from the double seam portion, and corrosion of the score portion and chuck wall portion was examined.

The obtained results are shown in Table 5.

TABLE 5

| | | | Tinplate | | | |
|---|---|---|---|---|---|---|
| | | Thickness | Current (mA) at Constant Voltage Electrolysis | Enamel Feather (%) | Corrosion State | |
| Run No. | Example No. | (μ) after Correction | | | Score Portion | Chuck Wall Portion |
| 19 | 7 | 10 | 0.05 | 0 | B | A |
| | | 30 | 0 | 0.2 | A | A |
| 20 | 8 | 10 | 0.05 | 0 | B | A |
| | | 30 | 0 | 0.1 | A | A |
| 21 | 9 | 10 | 0.10 | 0 | B | B |
| | | 30 | 0 | 0 | A | A |
| 22 | 10 | 10 | 0.22 | 0 | B | B |
| | | 30 | 0 | 0 | A | A |
| 23 | 11 | 10 | 0.36 | 0 | C | B |
| | | 30 | 0 | 0 | A | A |
| 24 | 12 | 10 | 0.19 | 0 | B | B |
| | | 30 | 0 | 0 | A | A |
| 25 | comparison 4 | 10 | 0.05 | 0.3 | B | A |
| | | 30 | 0 | 43.7 | A | A |
| 26 | comparison 5 | 10 | 0.05 | 0.1 | B | A |
| | | 30 | 0 | 15.3 | A | A |
| 27 | comparison 6 | 10 | 2.2 | 0 | C | D |
| | | 30 | 0.18 | 0 | B | B |

| | Aluminum Plate | | | |
|---|---|---|---|---|
| | Current (mA) at Constant Voltage Electrolysis | Enamel Feather (%) | Corrosion State | |
| Run No. | | | Score Portion | Chuck Wall Portion |
| 19 | 0.05 | 0 | B | A |
| | 0 | 0 | A | A |
| 20 | 0.06 | 0 | B | A |
| | 0 | 0 | A | A |
| 21 | 0.09 | 0 | B | B |
| | 0 | 0 | A | A |
| 22 | 0.26 | 0 | C | B |
| | 0 | 0 | A | A |
| 23 | 0.41 | 0 | C | B |
| | 0 | 0 | A | A |
| 24 | 0.23 | 0 | B | B |
| | 0 | 0 | A | A |
| 25 | 0.05 | 0.1 | B | A |
| | 0 | 39.4 | A | A |
| 26 | 0.05 | 0 | B | A |
| | 0 | 12.9 | A | A |
| 27 | 1.9 | 0 | C | D |

TABLE 5-continued

| | | | |
|---|---|---|---|
| 0.08 | 0 | B | A |

Note
A: not changed
B: slight spot corrosion
C: spot corrosion
D: spot corrosion on circumference

COMPARATIVE EXPERIMENT 4

In this comparative experiment, bonded cans were prepared by using the same epoxy-phenol-aldehyde paint as used in Comparative Experiment 1, and oil-dipped tuna fish was packed in the cans and the properties of the cans were examined and evaluated.

The epoxy-phenol-aldehyde paint used in Comparative Experiment 1 was roll-coated on one surface of a large TFS plate having a length of 836 mm, a width of 1026 mm and a thickness of 0.23 mm so that the thickness of the coating after baking was $2\mu$, and the coated paint was baked at 190° C. for 10 minutes. The same paint was roll-coated on the other surface so that the thickness of the coating after baking was $5\mu$, and the coated paint was baked at 205° C. for 10 minutes to obtain a both surface-coated steel plate. The large coated plate was cut into strips having a length of 836 mm and a width of 170.40 mm. Both the side edge portions along the lengthwise direction were heated at about 270° C. by high-frequency heating, and a tape of a nylon-12 type adhesive having a thickness of $50\mu$ and a width of 6 mm was roll-pressed to the surface, to be formed into the inner face of the resulting can, along one side edge portion for 35 milliseconds, and the strip was cooled. Simultaneously, in the other side edge portion of the strip, the same nylon-12 type adhesive tape having a thickness of $50\mu$ and a width of 8 mm was applied to the surface, to be formed into the outer face of the bonded portion of the resulting can, along a length of 5 mm, and the applied tape was bent to the inner face side of the can to protect the cut end face of the strip. The tape was roll-pressed under the same condition as described above.

The adhesive tape-applied strip was cut in the widthwise direction to form a can blank having a size of 92.08 mm × 170.40 mm and having the adhesive tape applied to both the side edge portions. By using an ordinary can manufacturing machine, the can blank was formed into a cylinder having a weight of 92.08 mm and the adhesive tape-applied side edge portions were heated at 250° C. by high-frequency heating, and both the side edge portions were lapped so that the adhesive tapes confronted each other and the lapped portion was pressbonded for 30 milliseconds to form a can body. The can body was subjected to flanging processing. Separately, the same epoxy-phenolaldehyde resin as used above was coated and baked on the inner and outer faces of a TFS plate, and a lid was punched out from this coated TFS plate by using an ordinary punching machine. A styrene-butadiene rubber type sealing compound was coated on the lid to form a 202-diameter can lid. The so obtained can lid was double-seamed to the above can body by an ordinary double seamer to obtain an empty bonded can.

Oil-dipped tuna fish was packed in so prepared various empty cans according to customary procedures, and the above-mentioned 202-diameter lids were double-seamed to the packed cans. The packed cans were subjected to retort treatment at 121° C. for 120 minutes. The number of the bonded cans broken by this retort treatment was checked and counted. The adhesion strength (T-peel strength, Kg/cm) of the bonded portion was examined before and after the retort treatment. The packed cans were stored at 37° C. for 3 years, and the adhesion strength of the bonded portion, the leakage of the content with the lapse of time [the vacuum degree (cmHg) in the can was measured at 20° C. by a vacuum gauge] and the state of corrosion of the coating in the double-seamed portion of the can body were examined.

The obtained results are shown in Table 6.

TABLE 6

| | | Retort Treatment at 121° C. for 120 Minutes | | | Storage at 37° C. for 3 Years | | |
|---|---|---|---|---|---|---|---|
| | | | T-Peel Strength (Kg/5 mm) | | | | |
| Run No. | Example No. | Number of Broken Cans | before treatment | after treatment | T-Peel strength (Kg/15 mm) | Leakage with Lapse of Time (cmHg) | Corrosion State of Double-Seamed Portion |
| 28 | 1 | 0/100 | 12 | 11 | 6 | 25 | not changed |
| 29 | 2 | 0/100 | 13 | 11 | 7 | 24 | " |
| 30 | 3 | 0/100 | 12 | 11 | 8 | 25 | " |
| 31 | 4 | 0/100 | 13 | 12 | 8 | 23 | " |
| 32 | 5 | 0/100 | 11 | 10 | 8 | 25 | " |
| 33 | 6 | 0/100 | 12 | 11 | 8 | 24 | " |
| 34 | comparison 1 | 63/100 | 12 | 3 | 0 | 0 | lifting of coating |
| 35 | comparison 2 | 25/100 | 13 | 5 | 0 | 0 | " |
| 36 | comparison 3 | 42/100 | 8 | 5 | 2 | 2 | corrosion by cracking of coating |

EXAMPLE 13

A reaction vessel was charged with 1 mol of bisphenol A and 1.4 mols of a 5% aqueous solution of sodium hydroxide, and the mixture was heated at 45° C. and 1.1 mols of epichlorohydrin was added thereto. Then, the mixture was heated at 100° C. and reacted for 4 hours. The aqueous layer was removed by a siphon, and 1 mol of methylisobutyl ketone was added to the residue to dissolve the resinous product therein. Then, the solution was washed with boiling water 3 times and heated at 180° C. to evaporate methylisobutyl ketone. The residue was cooled to obtain an epoxy resin having a number average molecular weight of 3560, an epoxy group concentration of 0.32 eq/Kg and an α-glycol group concentration of 0.30 eq/Kg.

A reaction vessel was charged with a mixed phenol of 0.5 mol of carbolic acid and 0.5 mol of p-cresol and 1.3 mols of a 37% aqueous solution of formaldehyde, and the mixture was heated at 50° C. and stirred to form a solution. Then, 0.1 mol of 25% aqueous ammonia was added as the basic catalyst, and the temperature was elevated to 95° C. and reaction was carried out for 2.5 hours. Then, a mixed solvent comprising 30 parts of methylisobutyl ketone, 20 parts of cyclohexanone and 50 parts of xylene was added to the reaction mixture to extract the condensation product. The extract was washed with deionized water 2 times and the aqueous layer was removed. A small amount of residual water was removed by azeotropic distillation, and the residue was cooled to obtain a 30% solution of a phenol-formaldehyde resin having a number average molecular weight of 298 and a methylol group concentration of 0.15.

The above-mentioned epoxy resin was dissolved in a mixed solvent comprising 50 parts of butyl cellosolve and 50 parts of xylene to form a 30% solution of the epoxy resin. This epoxy resin solution was mixed with the above-mentioned phenol-aldehyde resin solution so that the epoxy resin/phenol-aldehyde resin weight ratio was 75/25, and the mixture was subjected to precondensation at 105° C. for 2 hours to obtain an epoxy-phenol-aldehyde paint.

In the same manner as described in Comparative Experiment 3, easy-open can lids of a tinplate and an aluminum plate were prepared by using the so obtained paints. Apple juice was packed in can bodies, and the packed cans were stored at 37° C. for 3 months, 1 year or 3 years and the opening portions were opened. In each case, peeling of the coating was not observed and the inner surface of the lid was kept in a good condition without substantial corrosion.

Separately, in the same manner as described in Comparative Experiment 4, bonded cans (the adhesion strength of the bonded portion was 10 to 12 Kg/5 mm) were prepared by using the above-mentioned paint. Mackerel dipped in tomato catchup was packed in 500 of the so obtained bonded cans, and the packed cans were subjected to retort treatment at 121° C. for 120 minutes. No bonded can was broken at the retort treatment. When the cans were stored at 37° C. for 3 years, leakage of the content with the lapse of time was not observed (average vacuum degree in the can was 20 to 25 cmHg when 100 cans were tested). In each can, the adhesion strength of the bonded portion was 6 to 8 Kg/5 mm, and the double-seamed portion was kept in a good condition without substantial corrosion.

EXAMPLE 14

A reaction vessel was charged with 1 mol of bisphenol A and 1.5 mols of a 5% aqueous solution of sodium hydroxide, and the mixture was heated at 45° C. and 1.3 mols of epichlorohydrin was added thereto. The mixture was heated at 95° C. and reaction was carried out for 150 minutes. The aqueous layer was removed by a siphon, and the formed resin was dissolved in 1 mol of methylisobutyl ketone. The solution was washed with boiling water until the washing liquor became neutral. The resin solution was taken out from the reaction vessel and dried at 130° C. to obtain an epoxy resin having a number average molecular weight of 1440, an epoxy group concentration of 0.89 eq/Kg and an α-glycol group concentration of 0.45 eq/Kg.

Then, 90 parts of the so obtained epoxy resin was melt-mixed with 10 parts of dicyandiamide at 130° C. by an ordinary extruder. The mixture was rapidly cooled and pulverized by an ordinary pulverizer to obtain a powdery paint having an average particle size of 33μ.

The epoxy-phenol aldehyde paint of Example 3 was margin-coated on a tinplate having a thickness of 0.23 mm and an amount deposited of tin of 2.8 g/m² except the portion to be formed into a side seam of the resulting welded can so that the thickness of the coating after baking was 5μ on the inner face side and 3μ on the outer face side, and the coated paint was baked at 200° C. for 10 minutes. The coated plate was cut into a body blank (blank length=206.4 mm, blank height=104.5 mm), and the blank was formed into a cylinder by a roll former. The side edge portions were lapped and welded through a wire electrode by using an ordinary seaming welding machine to form a 211-diameter welded can having an inner capacity of 318.2 ml. The lap width of the side seam of the welded can was 0.4 mm. The above-mentioned powdery paint was coated on the seam portion of the welded can by using an ordinary electrostatic coating gun so that the thickness of the coating after baking was 50 to 70μ, and the coated paint was baked at 230° C. for 2 minutes.

The so obtained welded can body was subjected to flanging processing, and a 211-diameter tinplate lid formed by coating the above-mentioned epoxy-phenol paint on both the surfaces of a tinplate having a thickness of 0.26 mm, forming the coated plate into a 211-diameter can lid and applying a sealing compound thereto was double-seamed to the welded can body. Tuna dressing was packed in the can and the packed can was subjected to retort treatment at 121° C. for 90 minutes, and the can was stored at 37° C. for 1 or 2 years. When the can lid was removed and the side seam portion on the inner face of the can body was examined, it was found that rising of the coating or spot corrosion was not caused and a good condition was maintained.

What we claim is:

1. A paint for cans which comprises (1) an epoxy resin component formed by condensation of a dihydroxyl compound with an epihalohydrin and (2) a curing agent component, said epoxy resin component containing terminal α-glycol groups at a concentration of 0.05 to 0.60 equivalents per Kg of the resin, and terminal epoxy groups at a concentration of 0.20 to 1.80 equivalents per Kg of the resin.

2. A paint as set forth in claim 1 wherein the epoxy resin component is an epoxy resin in which the terminal α-glycol groups and the terminal epoxy groups are present at a molar ratio in the range of from 5/95 to 75/25.

3. A paint as set forth in claim 1 or 2 wherein the epoxy resin component is an epoxy resin represented by the following general formula:

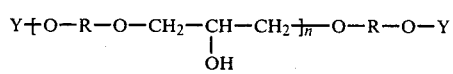

wherein R stands for a divalent residue formed by removing two hydroxyl groups from a dihydroxyl compound, espccially an alkylene or arylene group having 2 to 20 carbon atoms or a combination thereof, Y stands for

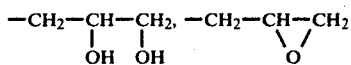

or a hydrogen atom, with the proviso that the following conditions (a) to (d) are satisfied: (a) the concentration of

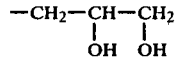

is 0.05 to 0.60 equivalent per Kg of the resin, (b) the concentration of

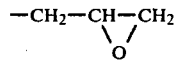

is 0.20 to 1.80 equivalents per Kg of the resin, (c) the molar ratio of

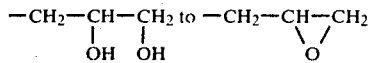

is in the range of from 5/95 to 75/25 and (d) terminal hydroxyl groups derived from a dihydroxyl compound may be present in an amount of up to 50 mol % based on the total terminal groups, and n is a number selected so that the number average molecular weight of the resin is 900 to 5500.

4. A paint as set forth in claim 1 wherein the epoxy resin component is an epoxy resin formed by condensation of an epihalohydrin with bisphenol A or bisphenol B.

5. A solution-type can paint as set forth in claim 1 wherein the curing agent component is a resinous curing agent selected from the group consisting of phenol-formaldehyde resins, urea-formaldehyde resins, malamine-formaldehyde resins, acrylic resins, alkyd resins and polyamide resins and the resinous curing agent is present in an amount of 5 to 60% by weight based on the epoxy resin component.

6. A powdery can paint as set forth in claim 1 wherein the curing agent component is an acid anhydride or dicyandiamide and is present in an amount of 3 to 40% by weight based on the solid epoxy resin component.

7. A coated metal can which is coated and baked at least on the inner face of a can lid or can body with the paint as set forth in claim 1.

* * * * *